United States Patent [19]

Dequesnes

[11] Patent Number: 5,655,640
[45] Date of Patent: Aug. 12, 1997

[54] DIAPHRAGM CLUTCH MECHANISM, ESPECIALLY FOR A MOTOR VEHICLE

[75] Inventor: Laurent Dequesnes, Fouilloy, France

[73] Assignee: Valeo, Paris, France

[21] Appl. No.: 624,712

[22] Filed: Mar. 26, 1996

[30] Foreign Application Priority Data

Mar. 30, 1995 [FR] France ............... 95 04000

[51] Int. Cl.$^6$ ............................................. F16D 13/58
[52] U.S. Cl. ............................................... 192/89.23
[58] Field of Search ........................... 192/89.23, 70.27, 192/89.22; 29/513

[56] References Cited

U.S. PATENT DOCUMENTS

| | | | |
|---|---|---|---|
| 4,084,674 | 4/1978 | De Gennes | 192/89.23 |
| 4,109,368 | 8/1978 | Hubbard et al. | 29/513 X |
| 4,326,611 | 4/1982 | Billet | 192/89.23 |
| 4,631,795 | 12/1986 | Ookubo et al. | 192/89.23 X |
| 4,751,991 | 6/1988 | Naudin . | |
| 5,301,782 | 4/1994 | de Briel et al. . | |

FOREIGN PATENT DOCUMENTS

| | | |
|---|---|---|
| 0 213 009 | 3/1987 | European Pat. Off. . |
| 0 535 702 A1 | 10/1995 | European Pat. Off. . |
| 25 52 963 A1 | 6/1976 | Germany . |

*Primary Examiner*—Rodney H. Bonck
*Attorney, Agent, or Firm*—Morgan & Finnegan, L.L.P.

[57] ABSTRACT

A clutch mechanism for a motor vehicle clutch comprises a cover plate and a diaphragm, which is mounted for pivoting deflection on the cover plate between a primary abutment carried by the cover plate and a secondary abutment formed on a crown ring. The crown ring is carried by assembly lugs which are joined to the cover plate, and which define a weakening groove of trapezoidal form. This weakening groove defines a bending line along which a terminal wing portion of the assembly lug is bent in an approximately radial direction. The weakening groove has two inclined side flanks. The inclined lateral flanks of each weakening groove are inclined with respect to the radial direction by different amounts, with the flank closer to the end portion of the assembly lug being inclined by a greater amount than the other flank which is closer to the cover plate.

4 Claims, 2 Drawing Sheets

DIAPHRAGM CLUTCH MECHANISM, ESPECIALLY FOR A MOTOR VEHICLE

FIELD OF THE INVENTION

The present invention relates in general terms to diaphragm clutch mechanisms, in particular for a motor vehicle, of the kind comprising: a cover plate, at least one plate referred to as a pressure plate, which is arranged to be joined to the cover plate for rotation with the cover plate but for axial movement with respect to it; a diaphragm having a peripheral portion defining a Belleville ring for acting on the pressure plate, and a central portion divided into radial fingers for action of a clutch release bearing thereon; and an assembly means applying the diaphragm pivotally and with an elastic gripping force against a primary abutment carried by the cover plate, the said assembly means comprising, firstly, assembly lugs joined to the cover plate, each assembly lug having an axial portion which extends through the diaphragm via widened apertures formed between the radial fingers of the latter and a terminal wing portion which is bent back along a weakening groove of the axial portion of each assembly lug, with each terminal wing portion defining, with the associated said axial portion of the assembly lug, a locating bend; and secondly, a crown ring which is located in the said locating bend and which is adapted to define, for the diaphragm, a secondary abutment which is disposed substantially in line with the primary abutment.

BACKGROUND OF THE INVENTION

A clutch mechanism of the above kind is adapted to be carried, through its cover plate, on a plate which constitutes the reaction plate of a clutch. The reaction plate is fixed to a first shaft, the latter being generally a driving shaft such as the crankshaft of the engine of the vehicle. A clutch friction wheel is interposed between the reaction plate and the pressure plate, the clutch friction wheel being fixed to a second shaft for rotation with the latter; this second shaft is, in general, a driven shaft such as the input shaft of the gearbox of the vehicle. A clutch release bearing is disposed around the driven shaft for controlling disengagement of the clutch, which is of the normally engaged kind. When the clutch is engaged, the pressure plate holds the clutch friction wheel against the reaction plate under the biassing effect of the peripheral portion of the diaphragm, i.e. the Belleville ring portion of the latter, so that the diaphragm bears on the primary abutment mentioned above.

A mechanism of the above kind is described in U.S. Pat. No. 4,751,991 and the corresponding French published patent application FR-2 585 424A. In that document, the crown ring is of frusto-conical form, and the weakening groove, or score line, defines a profile in the form of a trapezium which consists of a flat base between two inclined side flanks. That arrangement is satisfactory to the extent that it enables the gripping force to be obtained very precisely by virtue of the weakening groove. However, it is desirable to obtain even better control of the gripping force applied by the diaphragm between its primary and secondary abutments, in order to reduce friction effects.

DISCUSSION OF THE INVENTION

An object of the present invention is to provide a solution to this requirement, by providing an apparatus which enables the axial gripping force exerted by the crown ring on the diaphragm to be better controlled, while at the same time doing this in an inexpensive way.

According to the invention, a diaphragm clutch mechanism, in particular for a motor vehicle, of the kind comprising: a cover plate, at least one plate referred to as a pressure plate, which is arranged to be joined to the cover plate for rotation with the cover plate but for axial movement with respect it; a diaphragm having a peripheral portion defining a Belleville ring for acting on the pressure plate, and a central portion divided into radial fingers for action of a clutch release bearing thereon; and assembly means applying the diaphragm pivotally and with an elastic gripping force against a primary abutment carried by the cover plate, the said assembly means comprising: firstly, assembly lugs joined to the cover plate, each assembly lug having an axial portion which extends through the diaphragm via widened apertures formed between the radial fingers of the latter and a terminal wing portion which is bent back along a weakening groove of the axial portion of each assembly lug, with each terminal wing portion defining, with the associated said axial portion of the assembly lug, a locating bend; and secondly, a crown ring which is located in the said locating bend and which is adapted to define, for the diaphragm, a secondary abutment which is disposed substantially in line with the primary abutment, the said weakening groove of each assembly lug having a profile in the form of a trapezium defining a flat base between two inclined side flanks, is characterised in that the inclined side flanks of each weakening groove have different angles of inclination, such that the flank closer to the terminal wing portion of each assembly lug defines a larger angle of inclination than that of the other flank which is closer to the cover plate.

With this arrangement, during the operation of bending back the terminal end portions of the assembly lugs in order to form the above mentioned wing portions, or wings, of the latter, plastic flow of the material of the assembly lugs occurs in the weakening grooves in an asymmetrical manner, and this enables the Icad exerted by the crown ring on the diaphragm to be better controlled, while also enabling the lugs to be bent a little further if required. If necessary, with this arrangement the free ends of the lugs can be bent through an angle which is either less than 90° or greater than 90°.

Good results have been obtained in an arrangement according to the invention, by giving to that side flank of each weakening groove which is inclined by the greater amount with respect to the radial direction, an angle of inclination which is 10% greater than that defined by the other inclined side flank. For example, one of the flanks may have an angle of inclination of 62°30', while the other flank has an angle of inclination of 77°30'.

All of these arrangements enable the Icad exerted by the crown ring on the diaphragm to be closely controlled, and also result in a reduction in the friction effects during deflection of the diaphragm in service.

The various objects, features and advantages of the present will appear more clearly on a reading of the following description of preferred embodiments of the invention, which is given by way of example only and with reference to the accompanying drawings.

DESCRIPTION OF PREFERRED EMBODIMENTS OF THE INVENTION

Figure 1:
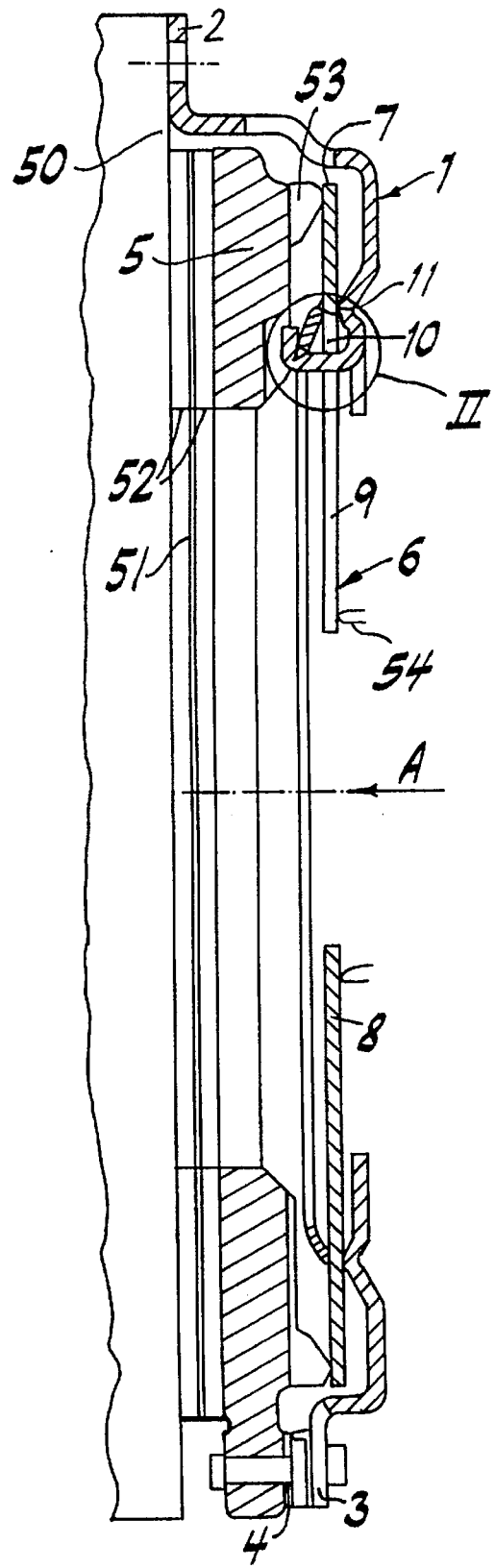
FIG. 1 is a view in axial cross section showing a clutch mechanism in accordance with the invention.

The drawings show a clutch mechanism for a motor vehicle, of the kind which comprises, in axial succession, at least one pressure plate 5, a diaphragm 6, which is of generally frusto-conical form in its free state, and a cover plate 1 which is made of metal, and which in this example is of press-formed metal plate. All of the components 5, 6 and 1 are of generally annular form.

The clutch mechanism constitutes a unitary sub-assembly. This subassembly is adapted to be secured, through the cover plate 1, on a flywheel 50 (indicated diagrammatically in FIG. 1), which is carried on a driving shaft (not shown), for rotation with the latter. In this example this driving shaft is the crankshaft of the engine of the vehicle, and the flywheel 50 may be of divided form.

The diaphragm 6 bears on the cover plate so as to exert a force on the reaction plate 5, so that a clutch friction wheel 51 can be gripped between the flywheel 50 and the pressure plate 5, the flywheel 50 thereby constituting the reaction plate of the clutch. It will therefore be seen that the clutch is of the normally engaged type, in which the engine torque is transmitted from the driving shaft to a driven shaft (not shown) through the clutch friction wheel 51. The driven shaft in this example is the input shaft of the gearbox of the vehicle, and the clutch friction wheel 51 includes a hub, not shown, which is splined internally for coupling it in rotation to the driven shaft.

The clutch friction wheel 51 is not itself part of the present invention, and, since it is of conventional construction, it will not be described in any further detail here. However, for the record it should be noted that the friction wheel 51 comprises a radial support disc which carries friction liners, indicated at 52, on each of its faces at the outer periphery of the support disc, to which the friction liners 52 are secured. The support disc is coupled to the above mentioned hub, either rigidly on a flange of the hub (to which it is secured by riveting, or, resiliently, through interposed resilient members which are mounted in housings formed in a damper plate), and a set of housings which are formed, in facing relationship with those in the damper plate, in a pair of guide rings arranged on either side of the damper plate. The damper plate and guide ring are not shown in the drawings. The damper plate is mounted on the above mentioned hub, for rotation with the latter, but may be arranged, in the manner known per se, in such a way that this rotation with the hub only takes place after an angular clearance has been taken up. The guide rings are fixed with respect to the support disc of the clutch friction wheel 51.

In order to disengage the clutch it is necessary to exert a force in the direction of the arrow A in FIG. 1, by means of a clutch release bearing having an actuating nose, which is the only part of the clutch lo release bearing 54 shown in FIG. 1. The clutch release bearing 54 acts through its actuating nose on the inner ends of the radial fingers 8 of the diaphragm 6, so as to cause the diaphragm 6 to cease exerting a force on the pressure plate 5, thereby releasing the friction liners 52 of the clutch friction wheel 51. In this example, the clutch release bearing 54 acts in a thrust mode on the inner ends of the fingers 8 of the diaphragm 6, the latter being mounted on the cover plate 1 for tilting deflection, in a manner to be described later herein. The pressure plate 5 is coupled to the cover plate 1 for rotation with the latter, but in such a way that it is movable axially with respect to the cover plate. This coupling is provided by connecting means 4 which are interposed between the cover plate 1 and the pressure plate 5. More precisely, the annular cover plate 1 has in this example the form of a dished plate, comprising a base portion which has a central free hole and which is joined, through a generally axially oriented annular skirt portion, to a fastening flange of the cover plate. The said flange and base portion are both oriented generally transversely, i.e. radially, with the base portion extending radially towards the axis of the assembly while the flange extends away from the latter. In this example, the connecting means 4 consist of tangentially oriented elastic tongues 4.

In this connection, the fastening flange of the cover plate 1 comprises a first set of coplanar portions 2 and a second set of coplanar portions 3 which are offset both axially and circumferentially from, and are in alternate relationship with, the first set of coplanar portions 2. The portions 2 are formed with holes, and suitable fastening members such as screws are passed through these holes in order to secure the clutch mechanism to the flywheel 50. Each of the tongues 4 is secured at one end, in this example by riveting, to the second set of coplanar portions 3 of the cover plate flange. The other end of each tongue 4 is secured to a radially oriented lug which projects from the outer periphery of the pressure plate 5, as can be seen in FIG. 1. The tongues 4 are spaced apart along a pitch circle, and the number of these tongues depends on the particular application. In the example shown in the drawings, there are three sets of tongues 4, which may be in superimposed relationship.

The skirt portion of the cover plate 1 in this example surrounds the clutch friction wheel 50, pressure plate 5 and diaphragm 6, and the flywheel 50 is of flat configuration. The flywheel 50 may of course be provided with a peripheral annular skirt, oriented axially and surrounding the friction liners 52 of the clutch friction wheel 51, so that the depth of the cover plate 1 itself depends on the particular application, and especially on the configuration of the flywheel.

In all cases, and in a manner known per se, the tongues 4 act as return springs biassing the pressure plate towards the base portion of the cover plate 1. This enables the friction liners 52 of the clutch friction wheel 51 to be released during the operation of disengaging the clutch.

The tongues 4 can of course be arranged to extend radially. In a further modification, the connecting means 4 may consist of radial tongues of the pressure plate 5, which are engaged in longitudinal apertures formed in the skirt portion in the cover plate 1, so as to define a coupling of the tenon and mortice type.

The diaphragm 6 comprises a peripheral portion 7 of the Belleville ring type, together with a central portion which is divided into the radial fingers 8 by means of slots 9. The slots 9 are open at their inner ends into the central aperture of the base portion of the diaphragm. The upper ends of these slots 9 terminate in widened apertures 10 which are formed at the inner periphery of the Belleville ring portion 7.

In this example the clutch mechanism is accordingly of the push-to-release, or thrust release, type, with the outer periphery of the Belleville ring portion 7 of the diaphragm 6 bearing on an annular projecting abutment ring 53 of the pressure plate 5. In this example the abutment ring 53 is of divided form. The Belleville ring portion 7 of the diaphragm is interposed at its inner periphery between a primary abutment 11 carried by the cover plate 1 (i.e. by the base portion of the latter), and a secondary abutment 17, FIG. 2, which is in radial alignment with the primary abutment 11 and which is carried by a set of assembly lugs 12. These assembly lugs 12 are joined to the cover plate 1, i.e. to the base of the latter. The primary abutment 11 consists in this example of a rounded bead press-formed in the cover plate 1.

More precisely, the secondary abutment 17 is defined at the outer periphery of an abutment ring 13 of the kind known as a crown ring, which is carried by the assembly lugs 12. Each assembly lug 12 includes an axial portion 14 which extends through the widened apertures 10 of the diaphragm 6. In this example, the axial portions 14 of the assembly lugs are formed integrally with the base portion of the cover plate I by stamping and bending. The lugs 12 are flat and thin, that is to say they have a rectangular cross section with a circumferential dimension substantially greater than their transverse or radial dimension. In the present example these lugs 12 are thin in the radial direction and elongated circumferentially.

Figure 2:
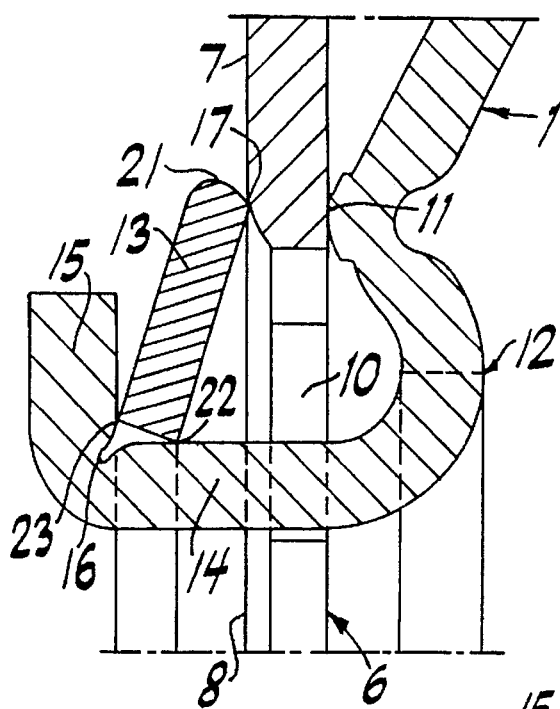
FIG. 2 repeats, on a much larger scale, the portion of FIG. 1 indicated within a circle at II in FIG. 1.

The free terminal end portion 15 of each lug 12, i.e. a portion of the latter at its end remote from the base portion of the cover plate 1, is adapted to be bent back, radially outwardly, so as to form a locating bend for the axial location of the crown ring 13 as shown in FIG. 2. In this example the crown ring 13 has a frusto-conical form, with a rounded edge 21 at its outer periphery which defines the secondary abutment 17.

The crown ring 13 lies entirely radially outside the assembly lugs 12. More precisely, the crown ring 13 is fitted over the axial portions 14 of the assembly lugs 12 before the end portions 15 are bent radially outwards. The lugs 12 are then placed in the press, in which the end portions 15 are then bent out as shown.

For this purpose, each axial portion 14 is formed with a weakening groove 16 which defines the bending line and which facilitates the bending operation. The weakening groove 16 has a trapezoidal cross section, with a flat base 19 and two inclined side flanks 30 and 31. The effect of this groove is to reduce the local thickness of the assembly lug 12. Initially, before the mechanism is assembled, and in particular before the cover plate 1, diaphragm 6 and crown ring 13 are stacked axially together, the end portion 15 of each assembly lug 12 is straight, being parallel to the axis of the assembly and aligned with the axial portion 14 of the lug.

The bending operation to turn the end portion 15 radially outwardly is carried out in two stages. In the first stage of this operation, bending is carried out against a conical anvil element, another tool being used in the second stage so as to complete the bending operation. It will however be understood that it is possible, alternatively, to perform this operation in a single step in the manner described in U.S. Pat. No. 4,109,368.

After the bending operation, the end portion 15 of each assembly lug 12 constitutes a wing portion, or wing, against which the crown ring 13 bears as shown in FIG. 2. The arrangement is such that the assembly lugs 12 apply a precompression force to the crown ring 13. The value of this force is for example greater than that of the diaphragm 6 at the level of the clutch release bearing 54, i.e. at the inner ends of the fingers 8 of the diaphragm. In this case, the diaphragm 6 is held in constant engagement on its primary abutment 11, the diaphragm being gripped elastically between the rounded (half wave) primary abutment 11 and the secondary abutment 17.

As can best be seen in FIG. 2, the crown ring 13 has at its inner periphery two inner edges 23 and 22, which are in contact, respectively, with the wing 15 and the axial portion 14 of the assembly lugs 12.

With regard to the weakening groove 16, it will be understood that there is plastic flow of metal at the site of this groove during the operation of bending the wing 15 outwardly. For this reason, the profile of the weakening groove 16 is very important in regard to the bending operation and the determination of the eventual elastic gripping force of the diaphragm 6. In order to control to the best advantage the elastic gripping force of the diaphragm 6, the profile of the trapezoidal weakening groove 16 is asymmetrical.

Figure 3:
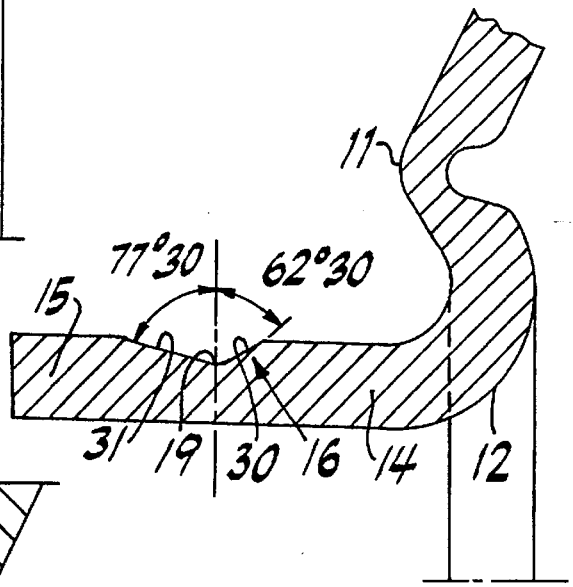
FIG. 3 is a scrap view, in the same cross section as FIG. 2, showing one assembly lug of the clutch mechanism prior to the terminal end portion of the lug being bent out.

The groove 16 is formed over the whole transverse width of each assembly lug 12, and in the present case it is open away from the axis of the assembly. The groove 16 reduces the local thickness of the lug 12. The weakening groove 16 has a cross sectional profile in the form of a trapezium, defining a flat base 19 between the two inclined side flanks 30 and 31. These flanks are inclined, as can be seen in FIG. 3, by different angles with respect to the radial plane in which the planes of the flanks 30 and 31 intersect. The flank 31 closer to the free end portion or terminal wing 15 of the assembly lug 12 is inclined by a greater angle, preferably at least 10% greater, than is the other flank 30, which is the one closer to the base portion of the cover plate 1. In this example, the angles of inclination of the inclined side flanks 30 and 31 are 62°30', and 77°30' respectively.

Thus, in the present case the angle of inclination of the side flank 31 is more than 10% greater than that of the other side flank 30. Also in this example, the depth of the weakening groove 16 is in the range between 0.15 e and 0.30 e, where e is the thickness of the assembly lug 12.

During the operation of bending the lugs 12 to form the wings 15, the consequent plastic flow of material at the groove 16 encroaches into the latter in an asymmetrical way, and this enables better control of the bending of the free end portion 15 to be obtained. The end portion 15 is bent back generally through an angle of 90°. However, this angle may be either less than 90° or greater than 90°, depending on the particular application.

The bending operation enables the frusto-conical crown ring 13 to be inclined to a greater or lesser extent, and thereby enables the load exerted by the crown ring 13 on the diaphragm 6, to cause the diaphragm to be gripped elastically between its resilient secondary abutment 17 and its rigid primary abutment 11, to be modified accordingly. The diaphragm 6 is thus able to be permanently held against its primary abutment 11. In this case, the assembly lugs 12, thanks to their locating bend joining the axial portions 14 to the wings 15 of the assembly lugs 12, apply to the crown ring 13 a precompressive force which is greater than that of the diaphragm at the level of the clutch release bearing 54.

The weakening groove 16 enables this precompressive force to be closely controlled, so that the force which is exerted by the crown ring 13 on the diaphragm 6, in order to urge the latter into contact with the primary abutment 11, is approximately the same as the maximum load which is exerted by the clutch release bearing 54 on the fingers 8 of the diaphragm 6.

Accordingly, the diaphragm is able to pivot in a satisfactory way between the abutments 17 and 11, in such a way that hysteresis effects (and therefore also friction effects) are reduced, with the secondary abutment 17, being itself deflected so as to compensate for the variation in thickness of the diaphragm 6 due to the inclination of the latter.

The asymmetrical weakening groove facilitates movement of the crown ring 13, in such a way that the latter is bedded less firmly on the locating bend of the assembly lug 12.

The force which is exerted by the crown ring 13 may be greater than the force exerted by the clutch release bearing 54 on the fingers 8 of the diaphragm 6 at the beginning of the operation of disengaging the clutch. The force exerted by the crown ring 13 then becomes less than that exerted by the clutch release bearing on the diaphragm, and may, at the end of the disengagement operation, become once again greater than the latter, in the manner described in U.S. Pat. No. 4,326,611. However, in a modified version, a clearance may be provided between the primary abutment 11 and the secondary abutment 17.

In general, the asymmetrical weakening groove 16 leads to a reduction in friction of the diaphragm 6 between its primary abutment 11 and secondary abutment 17.

Figure 4:
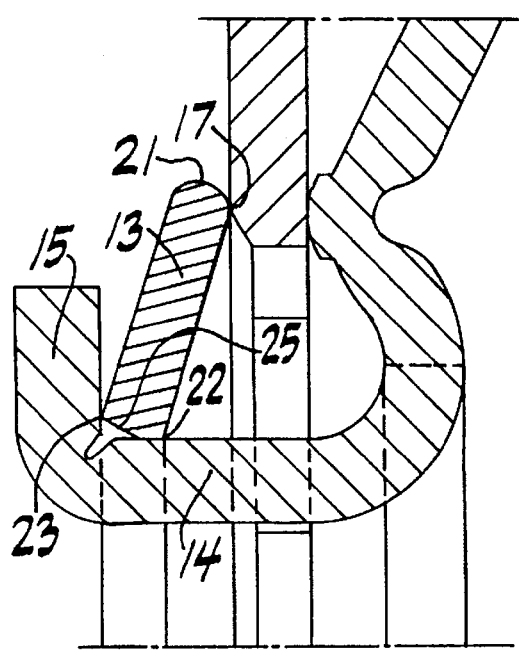
FIG. 4 is a view similar to FIG. 2, but shows a modified embodiment of the clutch mechanism in accordance with the invention.

The present invention is of course not limited to the particular embodiment described above. In particular, and as shown in FIG. 4, the inner edge 22 of the crown ring 13 may be rounded, in order to reduce embedding effects between the crown ring 13 and the axial portion 14 of the assembly lugs 12.

The assembly lugs 12 may be part of a comb-shaped annular member which extends through the base portion of the cover plate 1, being in engagement on the base portion of the cover plate that faces away from the diaphragm 6.

In another version, fingers of the kind shown in FIG. 7 of U.S. Pat. No. 4,326,611 may be employed, with these fingers extending through the base portion of the cover plate 1 and diaphragm 6, so as to have two terminal wings which are bent away from the axis of the assembly into contact with the crown ring and cover plate respectively. The assembly lugs 12 are then carried by the cover plate, being attached to the latter.

The crown ring 13 may be V-shaped at its outer periphery, with the apex of the V constituting the secondary abutment, and may be oriented radially at its inner periphery, as shown in FIG. 7 of the above mentioned U.S. Pat. No. 4,326,611.

The assembly lugs 12 may be thin in the circumferential direction and elongated in the radial direction. This is made possible because of the usual generally rectangular shape of the apertures 10 in the diaphragm. In that case, the lugs extend through windows which are formed in the crown ring 13 at the inner periphery of the latter, while the weakening grooves 16 then extend in the radial direction.

The rigid primary abutment 11 may be constituted by a toroidal ring fitted in a groove in the base portion of the cover plate.

The field of application of the invention also extends to the case where the clutch mechanism is mounted on the reaction plate. The assembly consisting of the clutch mechanism and the reaction plate can then constitute a clutch module which is eventually fastened on the crankshaft of the engine.

Finally, a support crown may be interposed between the crown ring and the bent back end portion 15 of the assembly lugs 12. In that case, the support crown absorbs the bending forces in the lugs 12, being radially longer than the bent back end portions 15 of the lugs 12. A clearance can then be provided between the primary abutment 11 and the secondary abutment 17.

In every case, the crown ring is located in the locating bend, either directly as in FIG. 1, or indirectly, by the support crown.

The angle of inclination between the two side flanks of the weakening groove is preferably greater than 90°, and more preferably greater than 100°. The difference of inclination between the side flanks 30 and 31 enables, for a given angle between the two side flanks, a maximum amount of material to be retained between the flank 30 and the root zone in which the assembly lugs 12 join the cover plate. In this way, the lugs 12 can be made more solid.

It is of course possible to reverse the structures, with the assembly lugs 12 extending axially away from the pressure plate 5, and in this case the pressure plate 5 has projecting elements extending through the cover plate 1.

What is claimed is:

1. A clutch mechanism, for a diaphragm clutch comprising the said mechanism and a clutch release bearing, the mechanism comprising: a cover plate defining a primary abutment; at least one pressure plate; means coupling the pressure plate to the cover plate for rotation of the pressure plate and cover plate together but for relative axial movement between the pressure plate and cover plate; a diaphragm comprising a peripheral Belleville ring portion for acting on the pressure plate, together with a central portion divided into radial fingers for action of a said clutch release bearing on the said radial fingers, the diaphragm defining widened apertures between the said radial fingers thereof; and assembly means for applying the diaphragm with an elastic gripping force pivotally against the said primary abutment, the said assembly means comprising a plurality of assembly lugs joined to the cover plate; each assembly lug comprising an axial portion extending through a respective said widened aperture of the diaphragm, and a terminal wing portion extending said axial portion, the wing portion being initially in a first orientation coplanar with the axial portion, being then bent away from the latter into a second orientation in which the said wing portion and axial portion define a locating bend at the junction between them, each lug defining a weakening groove at its said locating bend, the said assembly means further including a crown ring located in the said locating bend when the wing portions of the assembly lugs are in their second orientation, the crown ring defining a secondary abutment for the diaphragm, the said secondary abutment being disposed substantially in line with the said primary abutment, the said weakening groove of each assembly lug defining, in the said first orientation of the wing portion, a profile in the form of a trapezium comprising a first inclined side flank, a second inclined flank, and a flat base joining said first and second inclined flanks, the first and second inclined flanks being inclined by different amounts, with the said first flank, being that closer to the said terminal portion of the assembly lug, defining a greater angle of inclination with respect to the radial direction than that defined by the said second flank.

2. A clutch mechanism according to claim 1, wherein, in the said first orientation of the wing portion, the said first flank of each weakening groove defines an angle of inclination at least 10% greater than that of its second flank.

3. A clutch mechanism according to claim 1, wherein, in the said first orientation of the wing portion, the said first and second flanks of each weakening groove define an angle greater than 100° between them.

4. A clutch mechanism according to claim 1, wherein the assembly lugs are integral with the cover plate, each assembly lug having a circumferential length substantially greater than its radial thickness.

* * * * *